United States Patent [19]

Katoh

[11] 4,291,076
[45] * Sep. 22, 1981

[54] TRIM MOLDING STRIPS FOR A VEHICLE

[75] Inventor: Hisanori Katoh, Tokyo, Japan

[73] Assignee: Inoue Gomu Kogyo Kabushiki Kaisha, Aichi, Japan

[*] Notice: The portion of the term of this patent subsequent to Nov. 6, 1996, has been disclaimed.

[21] Appl. No.: 28,188

[22] Filed: Apr. 9, 1979

[51] Int. Cl.³ .................. B60R 13/02; B60R 13/04
[52] U.S. Cl. .................................. 428/31; 428/172; 418/195; 428/217; 428/268; 428/458; 428/462; 428/463; 428/465; 428/425.8; 428/412; 52/716; 293/126
[58] Field of Search .................. 49/479, 490; 293/128, 293/126; 428/31, 172, 217, 195, 268, 425.8, 412; 52/716

[56] References Cited

U.S. PATENT DOCUMENTS

| | | | |
|---|---|---|---|
| 2,230,734 | 2/1941 | Van Antwerp | 52/716 X |
| 3,448,550 | 6/1969 | Herr et al. | 52/98 |
| 3,471,979 | 10/1969 | Herr | 52/100 |
| 3,635,787 | 1/1972 | Shanok et al. | 428/31 X |
| 3,710,522 | 1/1973 | Fritz et al. | 52/716 X |
| 3,811,989 | 5/1974 | Hearn | 428/31 X |
| 4,094,056 | 6/1978 | Takeda et al. | 29/527.2 |
| 4,107,898 | 8/1978 | Andrzejewski | 49/490 X |
| 4,163,076 | 7/1979 | Katoh | 428/31 X |
| 4,188,765 | 2/1980 | Jackson | 428/217 X |

FOREIGN PATENT DOCUMENTS

| | | | |
|---|---|---|---|
| 1280062 | 10/1968 | Fed. Rep. of Germany | 52/716 |
| 2216958 | 10/1973 | Fed. Rep. of Germany | 293/128 |
| 864416 | 4/1961 | United Kingdom | 52/716 |

Primary Examiner—George F. Lesmes
Assistant Examiner—Alexander S. Thomas
Attorney, Agent, or Firm—Armstrong, Nikaido, Marmelstein & Kubovick

[57] ABSTRACT

A trim molding strip for a vehicle is provided. The molding strip comprises a synthetic resin body member having a central portion and first and second end portions at the ends of the center portion. A metal foil is bonded to the body member and the metal foil covers the central portion of the body member and at least a part of the first and second end portions. A soft plastic protective layer is bonded to the metal foil only on the portion of the metal foil which covers the first and second end portions of the body member. The protective layer covers at least a portions of the metal foil which cover the part of the first and second end portions of the body, and the protective layer is adapted for forming a protective layer between the metal foil and the surface of the vehicle at the first and second end portions of the body member.

11 Claims, 12 Drawing Figures

TRIM MOLDING STRIPS FOR A VEHICLE

BACKGROUND OF THE INVENTION

1. Field of the Invention

This invention is related to trim molding strips for vehicles and, in particular, to trim molding strips for vehicles which include a synthetic resin body, a metal foil covering the body and a protective layer which covers the metal foil on the end portions of the body.

2. Description of the Prior Art

In vehicles such as automobiles, the edges of the roof, window, doors, fenders, front grill, trunk, bonnet, etc. of the automobile and the side surface of the automobile body have been decorated with various trim molding strips which consist of a core of an aluminum foil and a shell of transparent thermoplastic, or a trim molding strip consisting of a core of metal foil, a clear plastic layer bonded to one surface of the core and a hard plastic substance bonded on the other surface of the core. These prior art trim strips are fitted or fixed on various parts of the vehicle body.

In the prior art trim molding strips discussed above, the lacquer on the vehicle body is likely to be damaged or destroyed by the trim and the damage or destruction of the lacquer will eventually result in rusting of the vehicle body.

Another disadvantage of the prior art trim molding strips is that the vehicle body has various irregularities. These irregularities often result in a partial or total misfit of the trim molding strip. The result of the misfitting is noise and a destruction of the lacquer with the consequent rusting which arises due to the vibration and shock of the misfitting trim strip against the vehicle body.

Still a further disadvantage of the prior art trim strips which include a metal foil, such as stainless steel, is that galvanic corrosion occurs at the contact surface of the car body and the metal portion of the strip as a result of the electrochemical action between the two different metals.

Still a further disadvantage of stainless steel molding trim strips is that they are heavy and have a high material cost.

SUMMARY OF THE INVENTION

It is the primary object of the present invention to provide a trim strip which does not damage or destroy the lacquer on a vehicle body during installation of the trim molding strip, or after installation and during operation of the vehicle.

It is another object of the present invention to provide a trim molding strip which assures a proper fit of the molding strip to the vehicle body in spite of irregularities in the vehicle body.

It is still another object of the present invention to provide a trim molding strip which does not generate noise as a result of vibration of the vehicle and molding strip.

It is still another object of the present invention to provide a trim molding strip which does not rust.

It is still a further object of the present invention to provide a trim molding strip which eliminates galvanic corrosion between the metal surface of the vehicle body and the metal foil of the trim strip.

It is still another object of the present invention to provide a trim molding strip which is lighter than prior art molding strips.

The present invention is directed to a trim molding strip for a vehicle which comprises a synthetic resin body member, a metal foil bonded to the body member and soft, plastic protective layers. The synthetic resin body member has a center portion, a first end portion at one end of the center portion, and a second end portion at the other end of the center portion. The metal foil is bonded to the body member and covers the center portion of the body member and at least a part of the first and second end portions. The soft plastic protective layer is bonded to the metal foil only on the portions of the metal foil which cover the first and second end portions of the body member. The protective layers cover at least a portion of the metal foil which covers part of the first and second end portions of the body member, and are adapted to form a protective layer between the metal foil and the surface of the vehicle at the first and second end portions of the body member.

DESCRIPTION OF THE PREFERRED EMBODIMENTS

Figure 1:
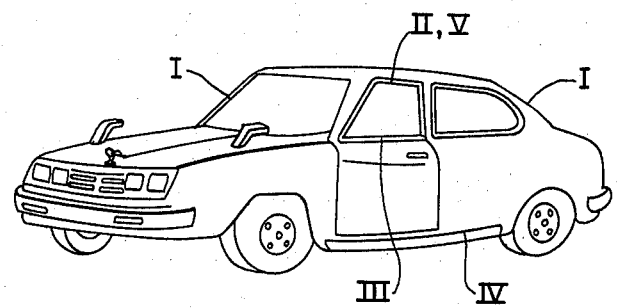
FIG. 1 is a perspective view of a vehicle showing the location of trim molding strips of the present invention.

FIG. 1 illustrates the location of the various types of molding of the present invention. In particular, molding I is a windshield or rear window trim, molding II and V are roof drain molding trim, III is a door belt molding trim, and IV is a step molding trim.

In the molding trim strips of the present invention, a plastic substrate has a metal layer bonded on one surface thereof and a protective layer bonded to the metal layer. The metal layer is a stainless steel foil or an aluminum foil having at least one anodized surface and the thickness of the metal layer, which depends on the desired trim strength, is in the range of 30–200 microns and, in the case of a window trim, 100–120 microns is preferable.

The plastic substrate or body member has a relatively high resistance to deformation under heat and materials such as acrylonitrile-butadiene-styrene, polycarbonate, polyphenylene oxide, acrylonitrile-styrene, polypropylene, polyvinyl chloride, polyamide, etc., or one of these glass fiber reinforced plastics, or one of these formed plastics where the repeating limits of the monomer is equal to a number from 2 to 10 in the final polymer. The thickness of the substrate is 0.5-2 mm.

The protective layer is formed with an elastomer such as soft polyvinyl chloride, ethylene-vinyl acetate copolymer, ionomer, thermoplastic polyurethane, thermoplastic rubber or acrylonitrile butadiene rubber, butyl rubber or a compound rubber of the rubbers and plastic, or a foamed one of the rubbers. The protective layer is fixed, either partially or wholly, to the part of the trim which contacts the car body. The thickness of the protective layer is in the range of 0.5-2 mm.

The trim molding strips of the present invention can be manufactured by a process which comprises providing a metal foil having a thin adhesive on at least one surface thereof, and extruding the plastic of the substrate and the protective layer on the metal foil in a die, as is shown in U.S. Pat. No. 3,136,676.

Figure 2A:
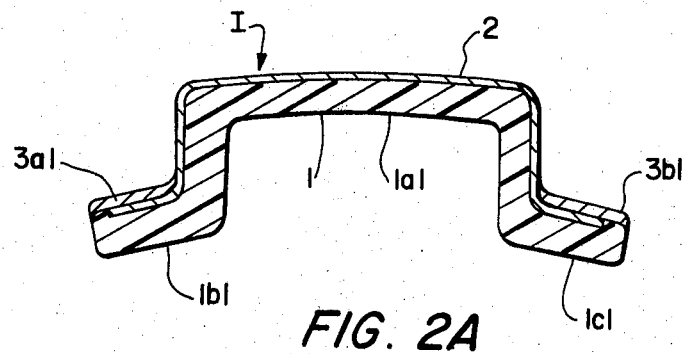
FIG. 2A is a cross-sectional view of a molding strip of the present invention.

FIG. 2A illustrates a first embodiment of the present invention. The trim molding strip I has a synthetic resin body member 1 which has a center portion $1a1$, a first end portion $1b1$, and a second end portion $1c1$. A metal foil 2 is bonded to the body member 1 and a first protective layer $3a1$ covers the metal foil on the first end portion $1b1$ of the body member, while protective layer $3b1$ covers the metal foil on the second end portion $1c1$ of the body member. The center portion $1a1$ of the body member 1 has a substantially U-shape and the end portion $1b1$ and $1c1$ form an obtuse angle with respect to the legs of the "U".

Figure 2B:
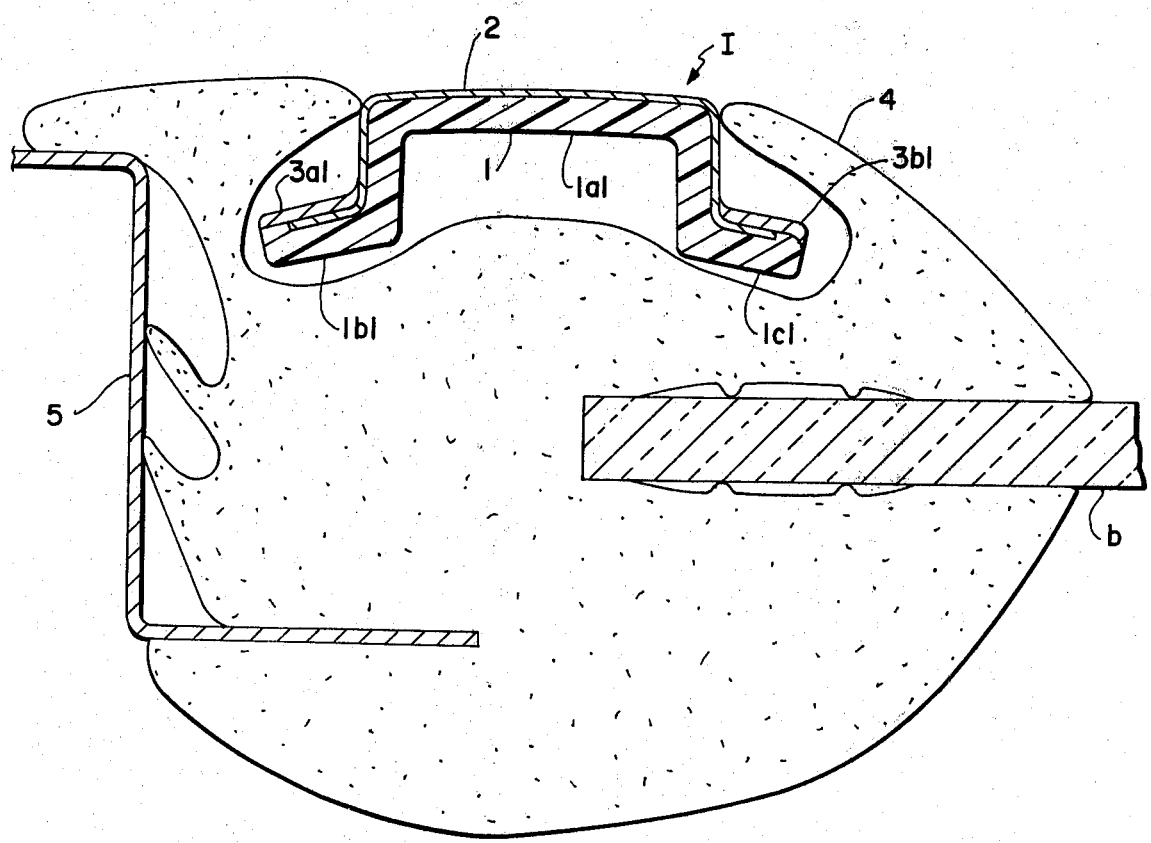
FIG. 2B illustrates the manner in which the molding strip shown in FIG. 2A is attached to the vehicle.

FIG. 2B illustrates the manner in which the molding trim strip of FIG. 2A is affixed to a vehicle when it is used as a windshield trim. The trim molding strip I is set in a weather strip 4 which is attached to a vehicle body 5 and a glass window 6. The window may be either the front or rear window of the vehicle.

Figure 3A:
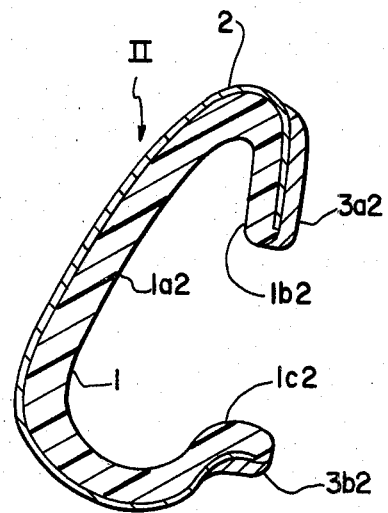
FIG. 3A is a second embodiment of a molding strip of the present invention.

FIG. 3A illustrates a second embodiment of the present invention. In FIG. 3A, the trim molding strip II has a body member 1 which has a center portion $1a2$ and first and second end portions $1b2$ and $1c2$. A metal foil 2 is bonded to the body member 1. Protective layers $3a2$ and $3b2$ cover the metal foil 2 on the end portion of the body member. The center portion $1a2$ of the body member has a general C-shape and the end portions $1b2$ and $1c2$ are on the ends of the center portion and extend perpendicular to one another.

Figure 3B:
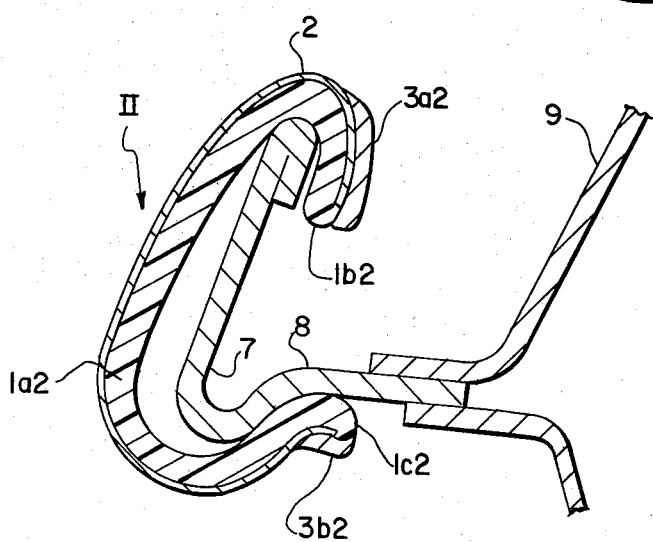
FIG. 3B illustrates the manner in which the molding strip of FIG. 3A is attached to a vehicle.

FIG. 3B illustrates the manner in which the trim molding strip III is attached to a vehicle. In particular, the trim molding strip surrounds the upright portion 7 of the roof drip channel 8, which is attached to the roof panel 9 of the vehicle.

Figure 4A:
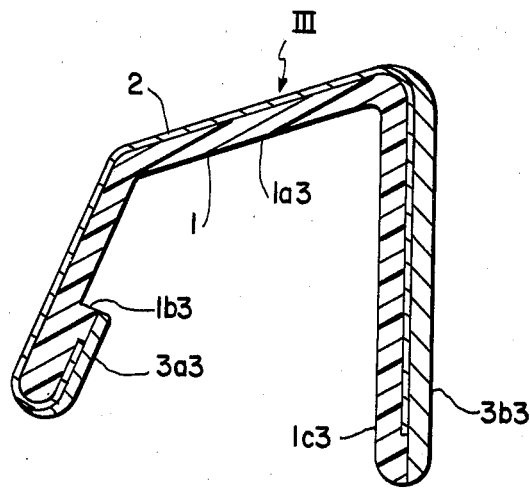
FIGS. 4A and 4B are third embodiments of a molding strip of the present invention.

FIG. 4A illustrates a third embodiment of the present invention in which a trim molding strip III has a body member 1 which has a center portion $1a3$, a first end portion $1b3$ and a second end portion $1c3$. The center portion has an L-shape with the first and second end portions extending from the ends of the L. The first end portion $1b3$ is thicker than the center portion $1a3$ and the second end portion $1c3$. A metal foil 2 is bonded to the body member 1 and protective layers $3a3$ and $3b3$ cover portions of the metal foil on the end portions $1b3$ and $1c3$.

Figure 4B:
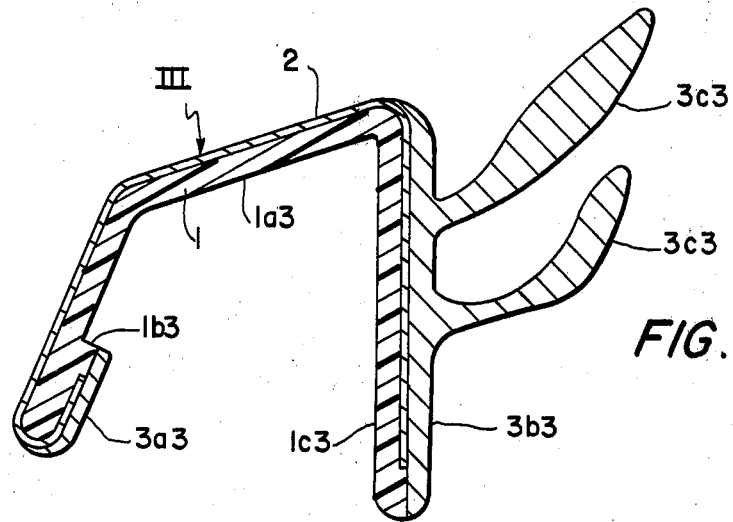

FIG. 4B illustrates an alternative embodiment of the at rim molding strip III in which the second end portion $3b3$ includes lips $3c3$.

Figure 4C:
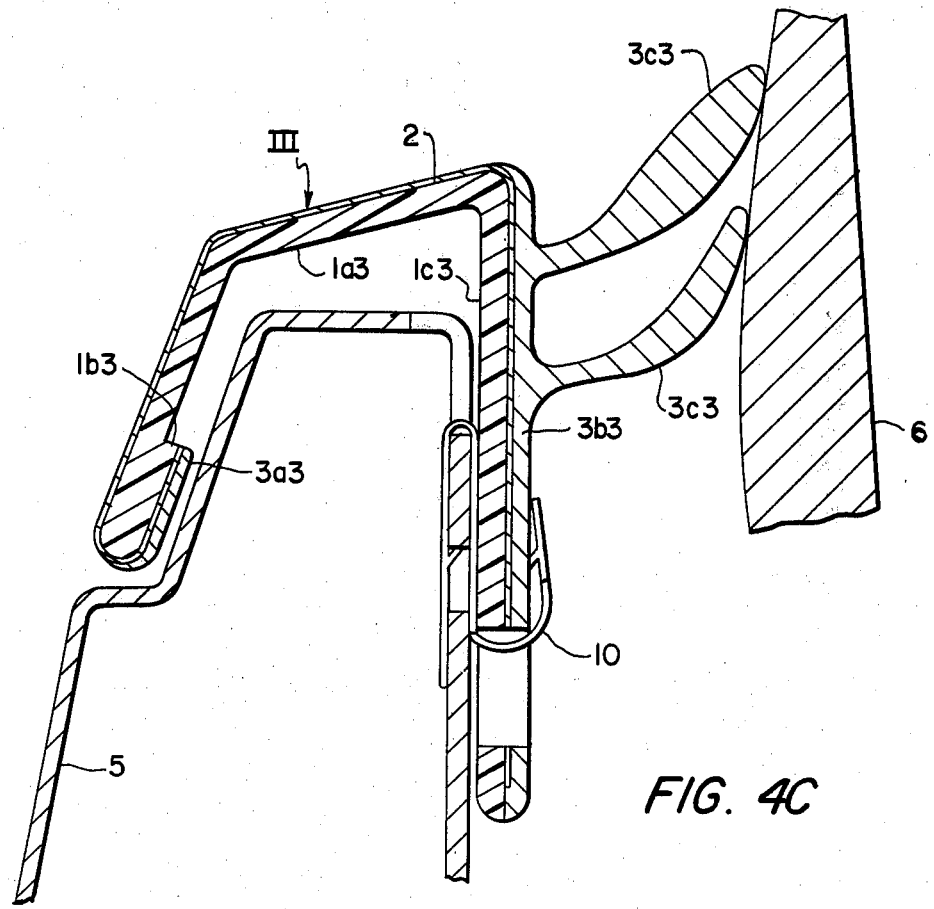
FIG. 4C illustrates the manner in which the molding strips of FIGS. 4A and 4B are attached to a vehicle.

Referring to FIG. 4C, the trim molding strip III is placed over a portion of the vehicle body 5 and is held in place by means of a clip 10. The lip portion $3c3$ of the protective layer $3b3$ contacts window 6 of the vehicle and forms a seal therewith. The protective layer $3a3$ is positioned between the metal foil 2 and the vehicle body 5, thereby preventing damage to the lacquer on the vehicle body and galvanic corrosion.

Figure 5A:
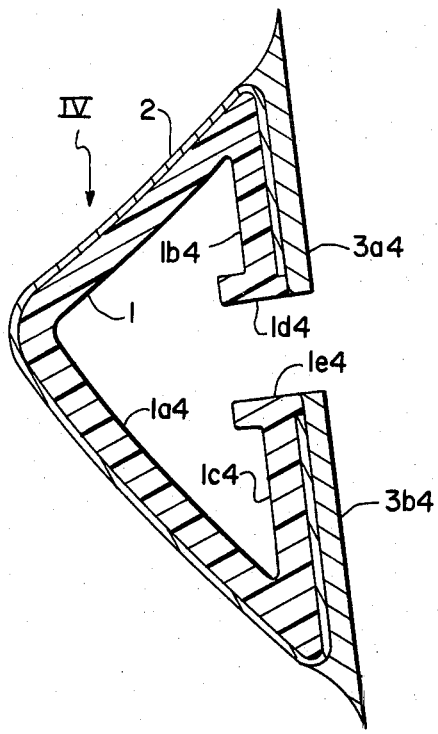
FIG. 5A is a fourth embodiment of a molding strip of the present invention.

FIG. 5A illustrates a fourth embodiment of the present invention. In the trim molding strip IV, shown in FIG. 5A, the body member 1 has a center portion $1a4$ having a generally C-shape and end portions $1b4$ and $1c4$ extending from the ends of the center portion. Anchors $1d4$ and $1e4$ are located on the ends of end portions $1b4$ and $1c4$. A metal foil 2 is bonded to the body member 1 and protective layers $3a4$ and $3b4$ cover the metal foil 2 on the end portions $1b4$ and $1c4$.

Figure 5B:
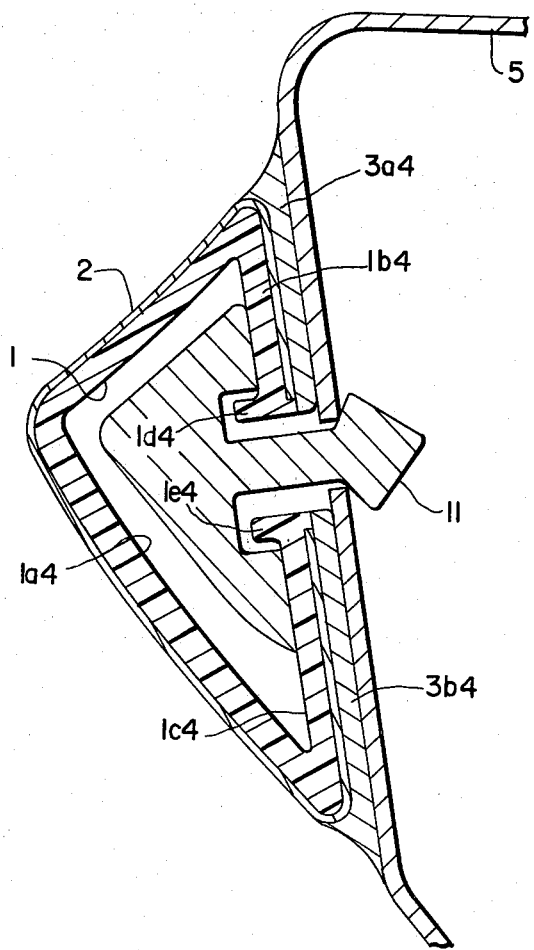
FIG. 5B illustrates the manner in which the molding strip of FIG. 5A is attached to a vehicle.

Referring to FIG. 5B, the trim molding strip IV is attached to a portion of the vehicle body 5 by means of a clip 11. The clip 11 surrounds the anchor portions $1d4$ and $1e4$ in order to prevent the trim molding strip from disengagement with the clip 11. The protective layers $3a4$ and $3b4$ are positioned between the vehicle body 5 and the metal foil 2, thereby preventing damage to the vehicle body 5 resulting from damage or destruction of the lacquer coating and/or galvanic corrosion.

Figure 6A:
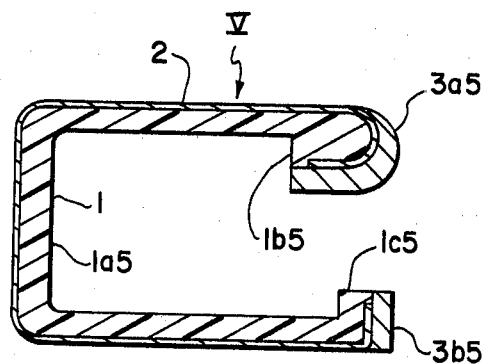
FIG. 6A is a fifth embodiment of a molding strip of the present invention.

FIG. 6A illustrates a fifth embodiment of the present invention. In the trim molding strip V of FIG. 6A, body member 1 comprises a center portion $1a5$, a first end portion $1b5$ and a second end portion $1c5$. The center portion $1a5$ has a generally C-shape, with the first and second end portions at the ends thereof. The first end portion $1b5$ is thicker than the center portion $1a5$ and the second end portion $1c5$ extends perpendicular to the center portion. A metal foil 2 is bonded to the body member 1 and protective layers $3a5$ and $3b5$ cover the foil 2 on the end portions $1b5$ and $1c5$ of the body member 1.

Figure 6B:
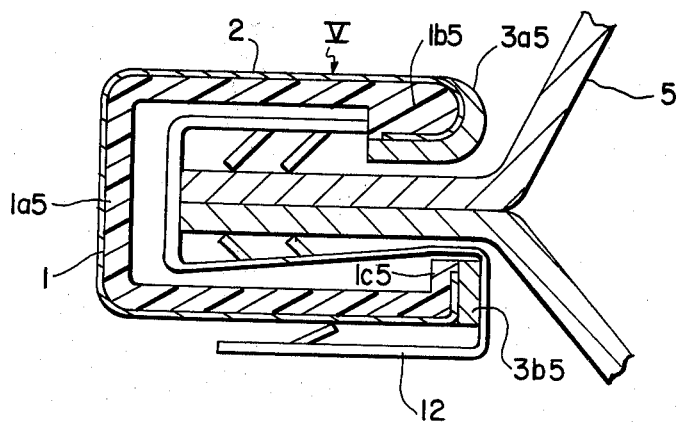
FIG. 6B illustrates the manner in which the embodiment of FIG. 6A is attached to a vehicle.

FIG. 6B illustrates the manner in which the trim moding strip 5 is attached to a vehicle. In particular, the trim molding strip 5 is attached to a portion of the vehicle body 5 by means of a clip 12 which engages the end portion $1b5$ and surrounds the second end portion $1c5$ of the body member 1. The protective layer $3a5$ is positioned between the vehicle body 5 and the metal foil 2, thereby preventing damage to the vehicle body 5.

In all of the embodiments of the applicant's invention, the protective layers $3a$ and $3b$ enable the trim molding strip to properly fit and contact the vehicle body and/or window. Furthermore, the protective layer avoids damage or destruction of the lacquer on the vehicle body when the trim strip is placed on the body and when the trim molding strip is vibrated as a result of the operation of the vehicle. In addition, the protective layer absorbs the vibration of the vehicle to eliminate noise. Still further, the protective layer compensates for irregularities in the dimensions of the vehicle and acts as an insulator between the metal foil of the trim molding strip and the metal surface of the vehicle body, thereby preventing galvanic corrosion.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims rather than the foregoing description, and all changes which come within the meaning and range of equivalency of the claims are, therefore, to be embraced therein.

What is claimed:

1. A trim molding strip for a vehicle comprising:

(a) a synthetic resin body member of a material having a high resistance to deformation selected from the group consisting essentially of acrylonitrile-butadiene-styrene, polycarbonate, poly-phenylene oxide, acrylonitrile-styrene, polypropylene, polyvinyl chloride, or polyamide, said body member having a center portion, a first end portion at one end of said center portion and a second end portion at the other end of said center portion;

(b) a metal foil bonded to said body member, said metal foil covering the center portion of said body member and covering at least a part of said first and second end portions; and (c) plastic protective layer means selected from the group consisting of soft polyvinyl chloride, ethylene-vinyl acetate copolymer, ionomer, thermoplastic polyurethane, thermoplastic rubber, acrylonitrile butadiene rubber, butyl rubber or a compound of the rubbers and plastic or a foamed one of the rubbers, bonded to said metal foil only on the portions of the metal foil which cover the first and second end portions of said body member, said protective layer means covering at least a portion of the metal foil which covers the part of said first and second end portions of said body member, said protective layer means being soft relative to said body member and adapted for positioning between said metal foil and a vehicle for contacting said vehicle and forming a protective layer between said metal foil and the surface of said vehicle at the first and second end portions of said body member.

2. A trim molding strip as set forth in claim 1 wherein said center portion is of a U-shape cross-section and said first and second end portions extend from the ends of the legs of said U-shaped center portion at an angle with respect thereto.

3. A trim molding strip as set forth in claim 2 wherein said angle is an obtuse angle.

4. A trim molding strip as set forth in claim 1 wherein said center portion is of a C-shape cross-section and said first and second end portions extend from the ends of the C-shaped center portion, the first end portion being perpendicular to the second end portion.

5. A trim molding strip as set forth in claim 1 wherein said center portion is of an L-shape cross-section and said first end portion is thicker than said second end portion.

6. A trim molding strip as set forth in claim 5 wherein said protective layer means on said second end portion includes lip means extending therefrom.

7. A trim molding strip as set forth in claim 1 wherein said center portion is of a C-shape cross-section and said first and second end portions extend therefrom in alignment with each other.

8. A trim molding strip as set forth in claim 7 wherein said first and second end portions each include an anchor means at an end thereof.

9. A trim molding strip as set forth in claim 1 wherein said center portion is of a C-shaped cross-section, said first end portion is thicker than said center portion and said second end portion extends perpendicular to the end of said center portion.

10. A trim molding strip as set forth in claim 1 wherein said resin body member includes glass fiber reinforcements.

11. A trim molding strip as set forth in claim 1 wherein the repeating limits of the monomer of said resin body member is equal to a number from 2–10 in the final polymer.

* * * * *